US 8,936,860 B2

(12) United States Patent
Kim

(10) Patent No.: US 8,936,860 B2
(45) Date of Patent: Jan. 20, 2015

(54) BATTERY PACK WITH REINFORCING MEMBER

(75) Inventor: Cheon-Soo Kim, Suwon-si (KR)

(73) Assignee: Samsung SDI Co., Ltd. (KR)

(*) Notice: Subject to any disclaimer, the term of this patent is extended or adjusted under 35 U.S.C. 154(b) by 1270 days.

(21) Appl. No.: 12/252,827

(22) Filed: Oct. 16, 2008

(65) Prior Publication Data

US 2009/0191450 A1    Jul. 30, 2009

(30) Foreign Application Priority Data

Jan. 24, 2008 (KR) ........................ 10-2008-0007508

(51) Int. Cl.
| H01M 14/00 | (2006.01) |
| H01M 2/02 | (2006.01) |
| H01M 2/04 | (2006.01) |
| H01M 10/42 | (2006.01) |
| H01M 2/10 | (2006.01) |

(52) U.S. Cl.
CPC .......... *H01M 2/021* (2013.01); *H01M 10/4257* (2013.01); *H01M 2/0473* (2013.01); *H01M 2/0275* (2013.01); *H01M 2/1061* (2013.01); *H01M 2/1094* (2013.01); *H01M 2200/00* (2013.01); *H01M 2200/106* (2013.01)
USPC ................ 429/7; 429/176; 429/179

(58) Field of Classification Search
CPC ........... H01M 2/0207–2/0212; H01M 2/0217; H01M 2/0275
USPC ......................... 429/7, 61–64, 175
See application file for complete search history.

(56) References Cited

U.S. PATENT DOCUMENTS

| 6,781,345 B2 | 8/2004 | Moon et al. |
| 2003/0077486 A1* | 4/2003 | Iwaizono et al. ................ 429/7 |
| 2004/0170887 A1* | 9/2004 | Masumoto et al. ............ 429/61 |
| 2005/0037259 A1* | 2/2005 | Maruyama .................... 429/176 |

(Continued)

FOREIGN PATENT DOCUMENTS

| EP | 1 717 882 | 11/2006 |
| JP | 2001-035465 | 2/2001 |

(Continued)

OTHER PUBLICATIONS

Machine Translation of KR 1020050096288.*

(Continued)

*Primary Examiner* — Barbara Gilliam
*Assistant Examiner* — Robert S Carrico
(74) *Attorney, Agent, or Firm* — Knobbe Martens Olson & Bear LLP

(57) ABSTRACT

A battery pack that can prevent deformation caused by external impact as well as leakage of an electrolyte. The battery pack includes a bare cell including a pouch type casing, an electrode assembly accommodated in the pouch type casing, and positive and negative electrode tabs extending from one side of the pouch type casing, a protection circuit board electrically connected to the bare cell, and a main body accommodating the bare cell and the protection circuit board. The battery pack also includes at least one reinforcing plate, wherein ends of the reinforcing plate are in contact with a surface of a front end portion of the bare cell or an inner surface of the main body. The reinforcing plate can be formed integrally with an upper or lower case of the main body or can be formed separately and disposed in the upper case or lower case.

11 Claims, 14 Drawing Sheets

(56) References Cited

U.S. PATENT DOCUMENTS

| | | |
|---|---|---|
| 2006/0035141 A1 | 2/2006 | Lee |
| 2006/0199075 A1 | 9/2006 | Moon et al. |
| 2006/0266542 A1 | 11/2006 | Yoon |
| 2008/0044731 A1* | 2/2008 | Nishio et al. .................. 429/317 |

FOREIGN PATENT DOCUMENTS

| | | |
|---|---|---|
| JP | 2003-242951 | 8/2003 |
| JP | 2004-103258 | 4/2004 |
| JP | P2005-183242 A | 7/2005 |
| KR | 2005-87632 | 8/2005 |
| KR | 2005-96288 | 10/2005 |
| KR | 10-2006-0022639 | 3/2006 |
| KR | 2006-67253 | 6/2006 |
| KR | 2006-84888 | 7/2006 |
| KR | 10-0649659 | 11/2006 |
| WO | 01/45184 | 6/2001 |
| WO | 03/096446 | 11/2003 |

OTHER PUBLICATIONS

Office Action issued by European Patent Office in European Patent Application No. 09151242.6-1227 on May 26, 2009.

Chinese Office Action dated May 5, 2011 of corresponding Chinese Patent Application No. 200910001982.5 with English translation—10 pages.

Office Action dated Jan. 17, 2012 in corresponding Japanese Patent Application No. 2008-256163.

Notice of Allowance Issued by the Korean Intellectual Property Office on May 17, 2010.

Office Action issued Aug. 24, 2009, in corresponding Korean Application No. 10-2008-0007508.

Office Action dated Oct. 30, 2012 in corresponding Japanese Patent Application No. 2008-256163.

\* cited by examiner

BATTERY PACK WITH REINFORCING MEMBER

CROSS-REFERENCE TO RELATED APPLICATION

This application claims the benefit of Korean Patent Application No. 2008-7508, filed Jan. 24, 2008 in the Korean Intellectual Property Office, the disclosure of which is incorporated herein by reference.

BACKGROUND OF THE INVENTION

1. Field of the Invention

Aspects of the present invention relate to a battery pack, and more particularly, to a battery pack that can prevent both deformation due to external impact and leakage of electrolyte.

2. Description of the Related Art

Secondary batteries are more economical than disposable batteries since they are rechargeable. Moreover, because secondary batteries are now being designed to be smaller but with higher capacity, secondary batteries are more widely used as power sources for handheld electronic/electrical appliances such as mobile phones, notebook computers, camcorders, digital cameras, etc. Types of secondary batteries include nickel-cadmium (Ni—Cd), nickel-metal hydride (Ni-MH), nickel-zinc (Ni—Zn), lithium (Li) ion, lithium metal and lithium polymer batteries.

Among these secondary batteries, lithium secondary batteries are widely used because they are compact, and have high capacity, high operating voltage and high energy density per unit weight. A lithium secondary battery may be classified into a can type or a pouch type according to the shape of the casing accommodating an electrode assembly. An electrode assembly includes a positive electrode plate, a negative electrode plate and a separator. Can type batteries may be further sub-classified into a cylindrical type and a prismatic type.

Lithium secondary batteries may be classified according to the kind of the electrolyte into a lithium metal battery or lithium ion battery, both of which use a liquid electrolyte, and a lithium ion polymer battery, which uses a solid electrolyte. Generally, a lithium ion battery using a liquid electrolyte employs a can type casing while a lithium ion polymer battery using a solid electrolyte employs a pouch type casing because the solid electrolyte is less likely to leak than the liquid electrolyte.

When a lithium secondary battery has a pouch type casing, an electrode assembly is accommodated in a lower member of the pouch type casing. Then, the lower member of the pouch type casing is covered by an upper member, and sealing parts initially formed at edges of the upper and lower members of the pouch type casing are joined and sealed. This assembly is called a bare-cell type secondary battery. The bare-cell type secondary battery is then electrically connected to a protection circuit board that includes a protection device to prevent damage to the battery because of any abnormal operations such as excess charging, excess discharging or excess current.

The secondary battery connected to the protection circuit board can be formed into a hard-pack battery pack that includes a separate outer case or an inner-pack type battery pack to make provision for tubing or labeling. In these situations, a front end portion of the bare cell from which positive and negative electrode tabs project is vulnerable to external impact. Accordingly, the pouch-type casing may be easily damaged by the external impact, which may result in a short circuit between the positive and negative electrode tabs as well as leakage of electrolyte from the damaged casing.

To solve these problems, in Korean Patent Publication No. 10-2005-0096288, a method is disclosed for adding a reinforcing plate to an outer case to prevent damage to a pouch type casing from external impact. However, the inventive method disclosed in Korean Patent Publication No. 10-2005-0096288 provides limited protection to the casing from external impact because there is a gap between the reinforcing plate and the sealing part of the pouch type casing. That is, since there is a gap between the bare cell and the protection circuit board, the protection circuit board or the bare cell may be moved by the external impact, and thus a short circuit between positive and negative electrode tabs may occur.

SUMMARY OF THE INVENTION

Aspects of the present invention provide a battery pack that can prevent both deformation caused by external impact as well as leakage of electrolyte.

According to one aspect of the present invention, the battery pack includes a bare cell having a sealing part; and a main body accommodating the bare cell, wherein the sealing part includes a front end portion from which positive and negative electrode tabs extend, and the front end portion is in contact with a reinforcing plate formed in the main body.

According to another aspect of the present invention, the battery pack includes a bare cell including a pouch type casing, an electrode assembly accommodated in the pouch type casing, and positive and negative electrode tabs that extend from one side of the pouch type casing; a protection circuit board electrically connected to the bare cell; and a main body accommodating the bare cell and the protection circuit board, and including a reinforcing plate, wherein an end of the reinforcing plate is in contact with a surface of a front end portion of the bare cell.

According to still another aspect of the present invention, a battery pack includes a bare cell including a pouch type casing, an electrode assembly accommodated in the pouch type casing, and positive and negative electrode tabs that extend from one side of the pouch type casing; a protection circuit board electrically connected to the bare cell; a main body accommodating the bare cell and the protection circuit board; and a reinforcing plate formed between the bare cell and the protection circuit board, wherein an end of the reinforcing plate is in contact with a surface of a front end portion of the bare cell, and the other end thereof is in contact with an inner surface of the main body.

The reinforcing plate may be disposed such that there is no space in the gap between the bare cell and the protection circuit board or the space in the gap between the bare cell and the protection circuit board is up to about 20 mm. A top surface of the front end portion of the bare cell may include protrusions formed where the positive and negative electrode tabs extend. The reinforcing plate may be formed of one flat plate. The reinforcing plate may further include an extension extending toward the bare cell, an extension extending toward the protection circuit board, or extensions extending toward both the bare cell and the protection circuit board from both edges of the flat plate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
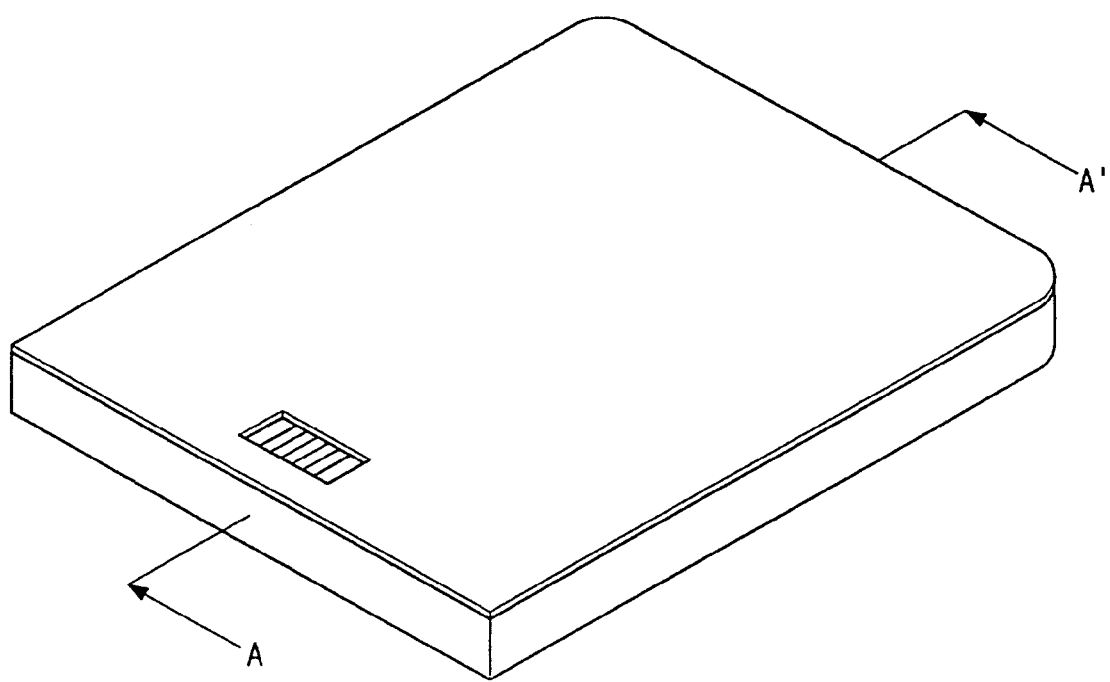
FIG. 1 is a perspective view of a battery pack according to an aspect of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
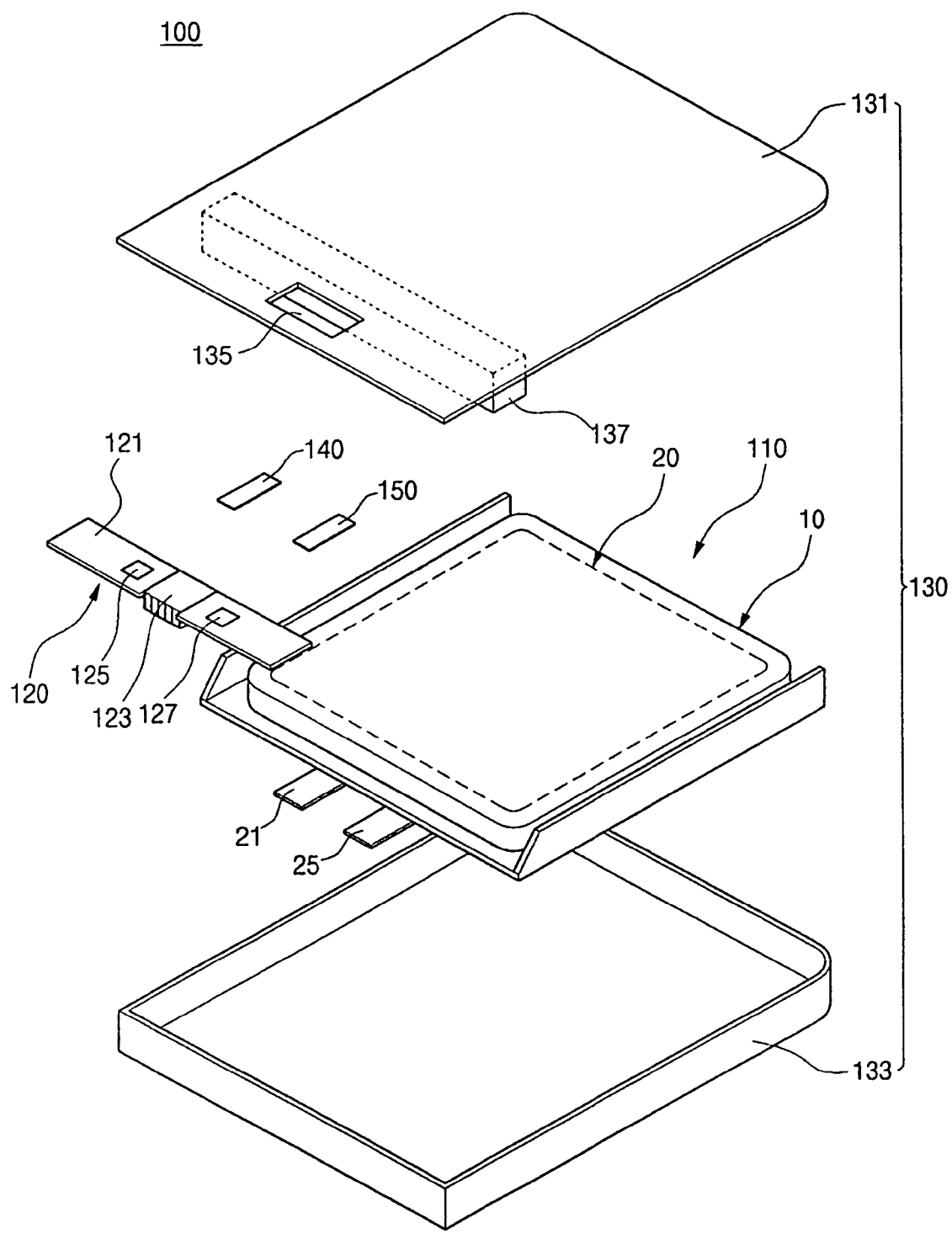
FIG. 2A is an exploded perspective view of the battery pack of FIG. 1 according to a first example embodiment of the present invention.
Figure 2B:
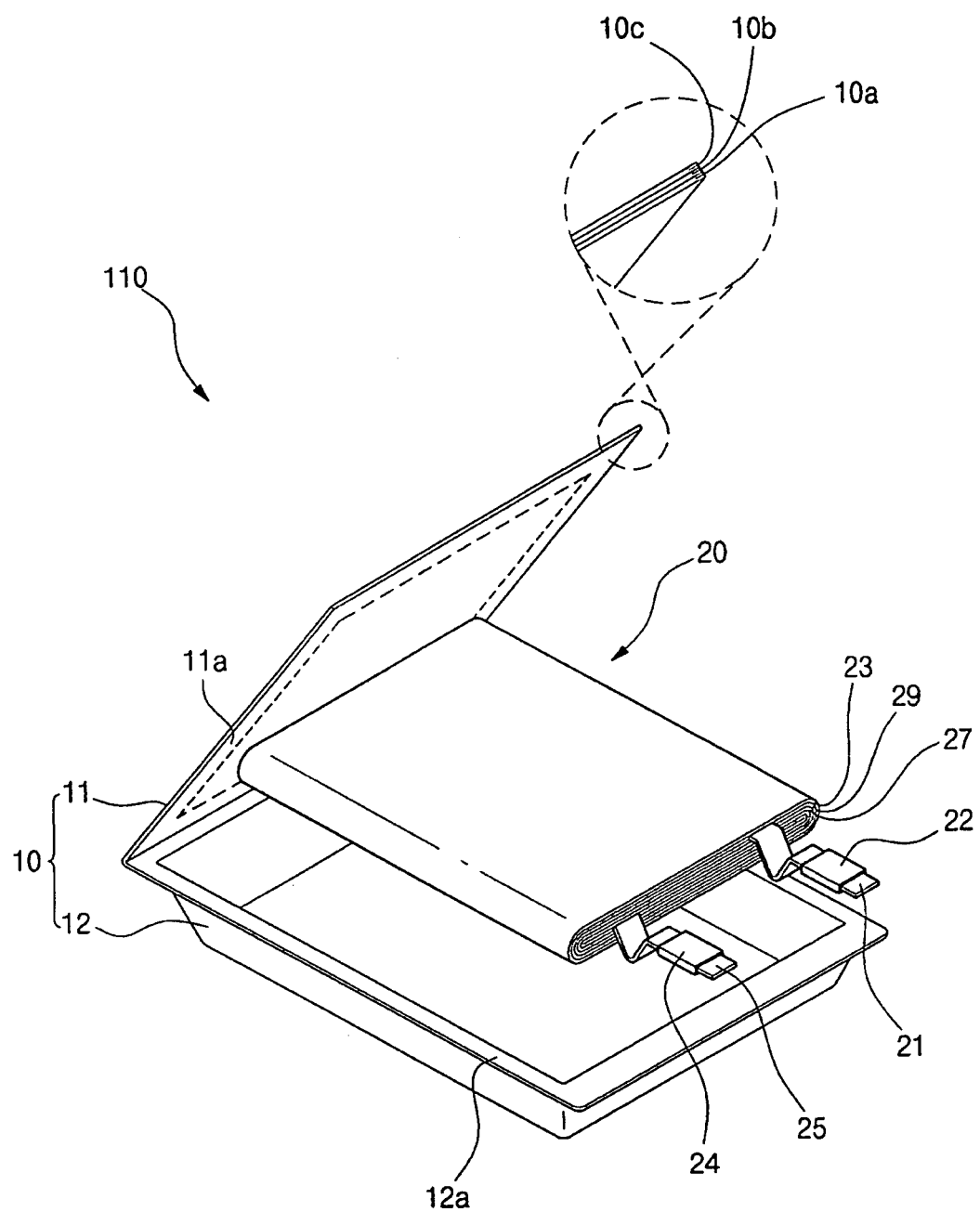
FIG. 2B is an exploded perspective view of an example of a bare cell in the battery pack of FIG. 2A.

FIG. 1 is a perspective view of a battery pack according to an aspect of the present invention, FIG. 2A is an exploded perspective view of the battery pack of FIG. 1 according to a first example embodiment of the present invention, and FIG. 2B is an exploded perspective view of an example of a bare cell in the battery pack of FIG. 2A. First, referring to FIG. 2B, a bare cell 110 in a battery pack of this embodiment of the present invention includes a pouch type casing 10 comprising an upper casing 11 and a lower casing 12, and an electrode assembly 20 accommodated in the pouch type casing 10.

The upper and lower casings 11 and 12 are joined to each other at one side, but open at the other sides so as to accommodate the electrode assembly 20. Either one of the upper and lower casings 11 and 12 may have a space for accommodating the electrode assembly 20; the space is formed in the lower casing 12 in this first example embodiment.

An upper sealing part 11a and a lower sealing part 12a are formed at the edges of the upper and lower casings 11 and 12, and sealed together by thermal bonding. The upper and lower casings 11 and 12 may also be formed in a multi-layered structure that includes a thermal bonding layer 10a serving as a sealant to bond the upper and lower casings 11 and 12 when heated, a metal layer 10b to maintain mechanical strength and serve as a barrier layer against moisture and oxygen, and an insulating layer 10c. The shape and structure of the pouch type casing 10 are not limited to those illustrated in this first example embodiment, and thus may be modified and changed in various ways by those skilled in the art.

The electrode assembly 20 includes a first electrode plate 23 connected to a first electrode tab 21, a second electrode plate 27 connected to a second electrode tab 25, and a separator 29 interposed between the two electrode plates 23 and 27, where the first and second electrode plates 21 and 25 and the separator 29 are wound together. Here, the first and second electrode tabs 21 and 25 extend from one side of the sealed pouch type casing 10.

Hereinafter, the side of the pouch type casing 10 from which the first and second electrode tabs 21 and 25 extend is referred to as the front end portion of the bare cell 110. Further, the first electrode tab 21 is referred to as the positive electrode tab, and the second electrode tab 25 is referred to as the negative electrode tab. Accordingly, the first electrode plate 23 connected to the first electrode tab 21 is referred to as the positive electrode plate, and the second electrode plate 27 connected to the second electrode tab 25 is referred to as the negative electrode plate.

Also, the bare cell 110 may further include tab tapes 22 and 24 which wrap the portions of the first electrode tab 21 and the second electrode tab 25 overlapped with the upper sealing part 11a and the lower sealing part 12a. But the tab tapes 22 and 24 will be omitted in the drawing drawn hereafter.

Referring now to FIG. 2A, the battery pack 100 according to the first example embodiment of the present invention includes a bare cell 110, a protection circuit board 120, and a main body 130 comprising first and second cases 131 and 133. Hereinafter, the first case 131 is referred to as an upper case, and the second case 133 is referred to as a lower case.

The battery pack 100 may further include first and second lead plates 140 and 150 for electrically connecting the bare cell 110 to the protection circuit board 120. The bare cell 110 is the same as that described with reference to FIG. 2B, so it will not be described any further. The same reference numerals used in FIG. 2B will be applied to this drawing.

The protection circuit board 120 is disposed at one side of the bare cell 110, and electrically connected to the bare cell 110. The protection circuit board 120 includes protection devices (not shown) such as a protection circuit, a charge/discharge device, a PTC thermistor and a fuse, which are formed on a printed circuit board 121 on which an interconnection pattern is formed, and may further include an external connection terminal 123 to be electrically connected to an external device. The external connection terminal 123 may include at least one terminal, such as a power supply terminal, a ground terminal, input/output terminals, and a thermistor terminal.

The protection circuit board 120 further includes first and second electrode terminals 125 and 127 that are electrically connected to the positive and negative electrode tabs 21 and 25 of the bare cell 110, respectively. Hereinafter, the first electrode terminal 125 is referred to as a positive electrode terminal, and the second electrode terminal 127 is referred to as a negative electrode terminal.

The positive and negative electrode tabs 21 and 25 of the bare cell 110 may be directly and electrically connected to the positive and negative electrode terminals 125 and 127 of the protection circuit board 120 by ultrasonic or laser welding or use of solder cream. Alternatively, the electrical connection between the positive and negative electrode tabs 21 and 25 of the bare cell 110 and the positive and negative electrode terminals 125 and 127 of the protection circuit board 120 may be made by first and second lead plates 140 and 150.

The first lead plate 140 electrically connects the positive electrode tab 21 to the positive electrode terminal 125, and the second lead plate 150 electrically connects the negative electrode tab 25 to the negative electrode terminal 127. The first and second lead plates 140 and 150 may be formed of nickel plate, but materials and shapes are not limited.

Outside the bare cell 110 and the protection circuit board 120, a main body 130 is provided to protect the bare cell 110 and the protection circuit board 120 from external impact as well as to form an exterior shape. The main body 130 may comprise the upper and lower cases 131 and 133 as illustrated in this first example embodiment. The upper and lower cases 131 and 133 may be coupled by various methods, for example, bonding, welding and fastening, and are designed so as to accommodate the bare cell 110 and the protection circuit board 120.

In one of the upper and lower cases 131 and 133, a space is formed for accommodating the bare cell 110 and the protection circuit board 120. Further, the space is sealed by bonding the case having the space with the other case which does not have the space. In this first example embodiment, the space is formed in the lower case 133, and the main body 130 is sealed by bonding the lower case 133 with the upper case 131. Of course, the shapes of the upper and lower cases 131 and 133 are not limited to this first example embodiment, and thus may be formed in various ways. For example, both the upper and lower cases 131 and 133 may have the spaces. Further, the inner walls of the upper and lower cases 131 and 133 may be in contact with outer surfaces of the bare cell 110 and the protection circuit board 120 to minimize the movement of the bare cell 110 and the protection circuit board 120.

In one side of one of the upper and lower cases 131 and 133, a terminal hole 135 may be formed to expose the external connection terminal 123 of the protection circuit board 120; the terminal hole 135 is formed in the upper case 131 in this first example embodiment. The terminal hole 135 may be formed in various shapes to expose the external connection terminal 123 of the protection circuit board 120, and formed anywhere in the upper or lower case 131 or 133.

Figure 2C:
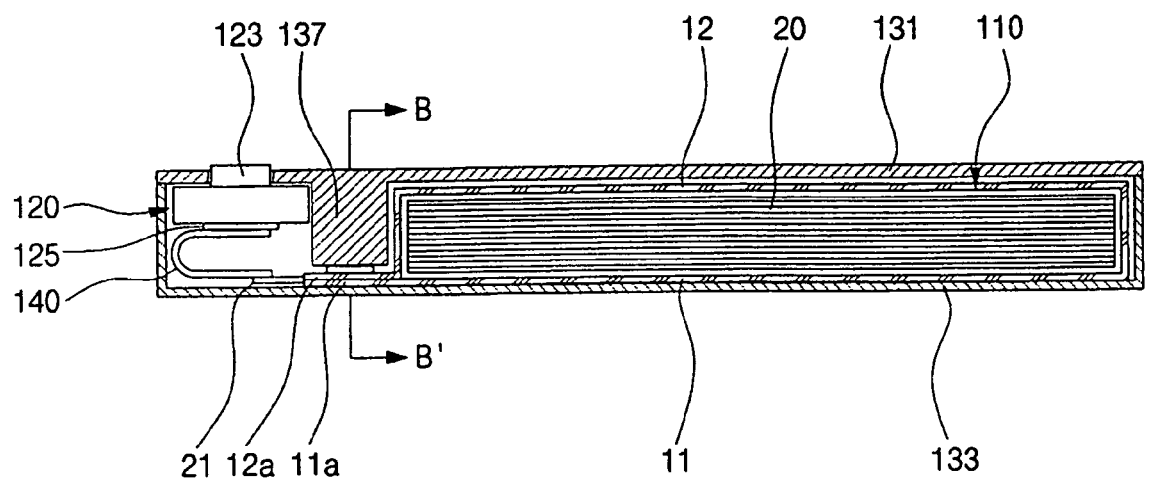
FIG. 2C is a cross-sectional view of the battery pack of FIG. 2A taken along line A-A' of FIG. 1.

Further, a reinforcing plate 137 is formed on one side of the upper case 131, and referring to FIG. 2C, the reinforcing plate 137 passes between the bare cell 110 and the protection circuit board 120, both of which are accommodated in the main body 130. The reinforcing plate 137 may be integrally formed with the upper case 131 during molding of the upper case 131.

FIG. 2C is a cross-sectional view of the battery pack of FIG. 2A according to the first example embodiment of the present invention and taken along line A-A' of FIG. 1. While, in FIG. 2C, the lower casing 12 of the bare cell 110 is spaced apart from the upper and lower cases 131 and 133, the lower casing 12 may be disposed in contact with inner surfaces of the upper and lower cases 131 and 133 to prevent the movement of the bare cell 110.

The lower end of the reinforcing plate 137 is formed in contact with the top surface of the front end portion of the bare cell 110 that is accommodated in the main body 130. When in contact with the top surface of the front end portion of the bare cell 110, the reinforcing plate 137 may be formed to press the top surface of the front end portion of the bare cell 110. However, since excess pressure on the top surface of the front end portion of the bare cell 110 may damage the pouch type casing 10, the applied pressure may be carefully designed by those skilled in the art so as not to damage the casing 10.

On the other hand, adhesion between the sealing parts 11a and 12a of the upper and lower casings 11 and 12 may be enhanced by the pressure applied to the front end portion of the bare cell 110 because of the lower end of the reinforcing plate 137. Accordingly, easy opening of the sealing parts 11a and 12a of the upper and lower casings 11 and 12 due to external impact may be prevented, and thus, leakage of electrolyte can also be prevented.

Moreover, even if there is an external impact, the reinforcing plate 137 serves as a support, which thus may prevent deformation of the upper and lower cases 131 and 133 as well as deformation of the bare cell 110 and the protection circuit board 120. Therefore, when the reinforcing plate 137 is interposed between the bare cell 110 and the protection circuit board 120, the thickness of the reinforcing plate 137 may be designed such that the gap between the bare cell 110 and the protection circuit board 120 is filled.

However, when the gap between the bare cell 110 and the protection circuit board 120 is filled, the reinforcing plate 137, itself, may impact or damage the bare cell 110 or the protection circuit board 120. Thus, it is preferable that the thickness of the reinforcing plate 137 is designed with a small space in the gap between the bare cell 110 and the protection circuit board 120. On the other hand, when the space within the gap is too great, the bare cell 110 and the protection circuit board 120 can move too much when there is an external impact. Ideally, the thickness of the reinforcing plate 137 may be designed such that the unfilled space in the gap between the bare cell 110 and the protection circuit board 120 is designed to be up to about 20 mm.

Figure 2D:
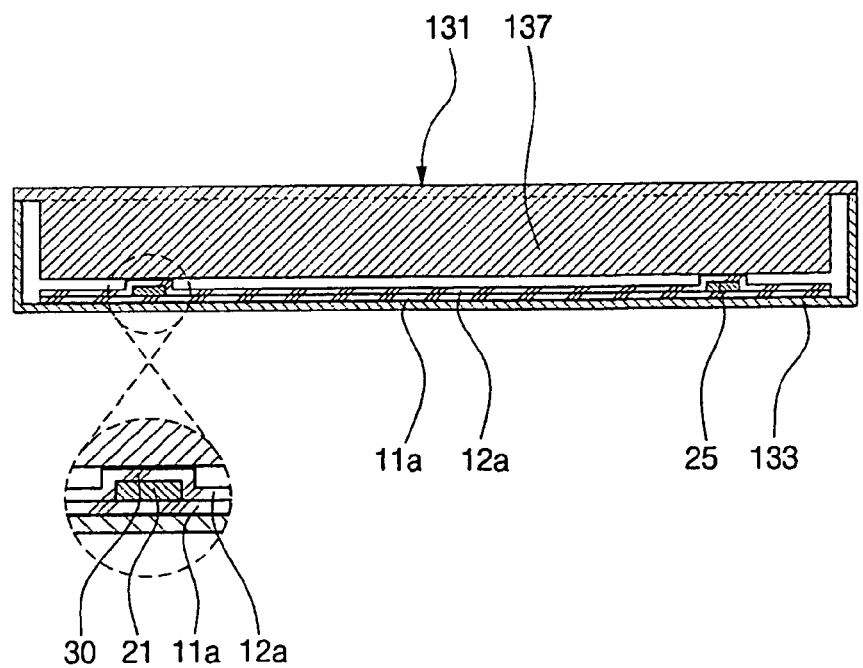
FIGS. 2D to 2F are cross-sectional views of the battery pack taken along line B-B' of FIG. 2C.
Figure 2E:
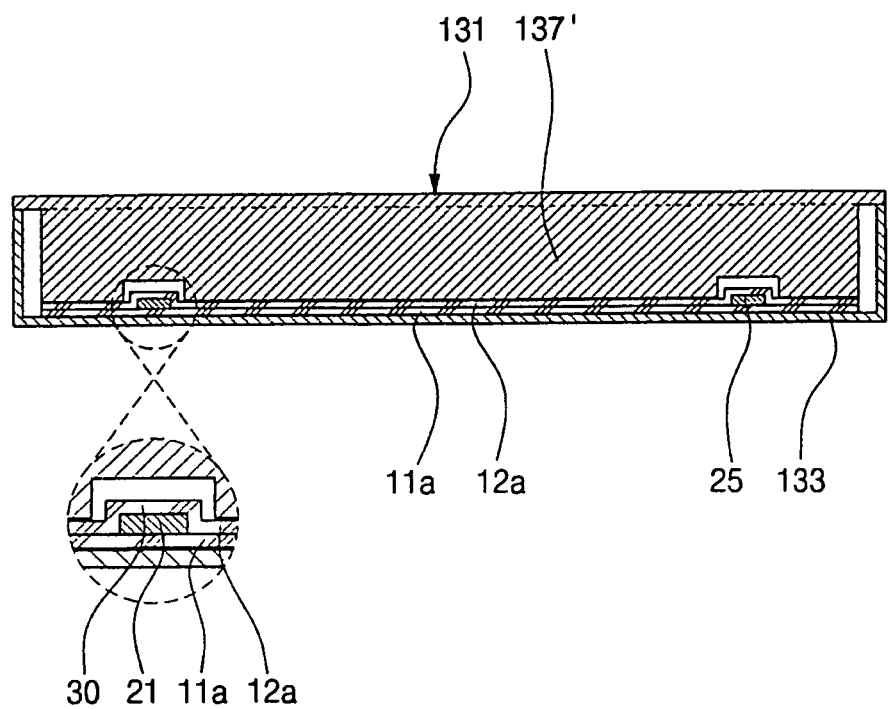
Figure 2F:
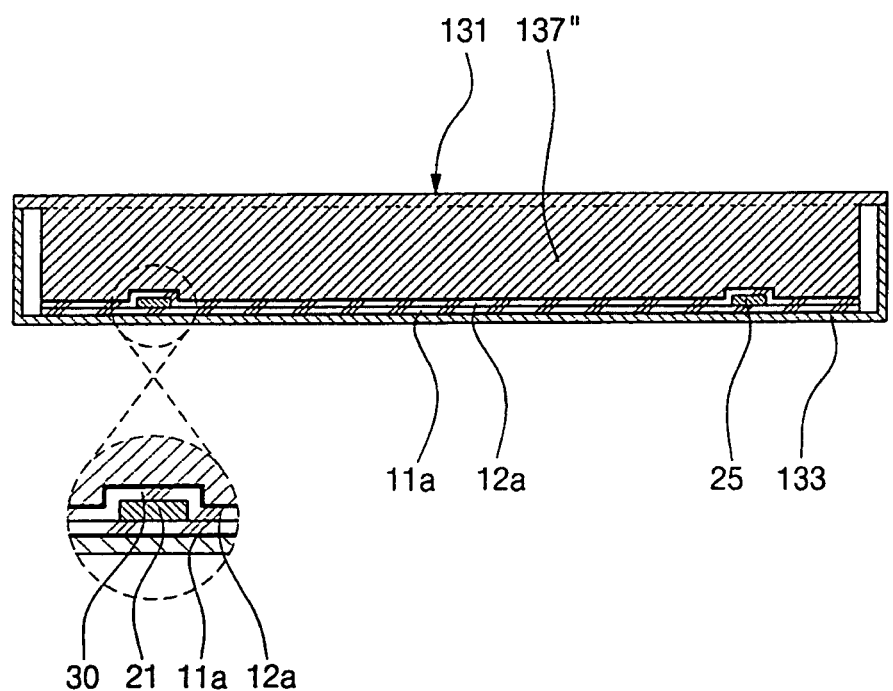

Referring to FIGS. 2D to 2F illustrating cross-sectional views of the battery pack of FIG. 2C taken along line B-B', in FIG. 2D the lower end of reinforcing plate 137 may be in contact only with the top surface of a protrusion 30, which is formed on the front end portion of the bare cell 110 by the positive or negative electrode tab 21 or 25. Alternatively, as illustrated in FIG. 2E, the lower end of reinforcing plate 137' may be in contact only with the top surface of the front end portion of the bare cell 110, with the exception of the protrusion 30. Or, as illustrated in FIG. 2F, the lower end of reinforcing plate 137" may be in contact with the entire top surface of the front end portion of the bare cell 110 including the protrusion 30.

Figure 2G:
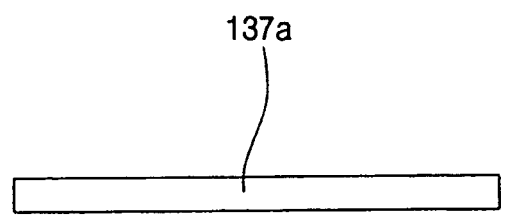
FIGS. 2G to 2J are plan views illustrating various forms of a reinforcing plate according to an exemplary embodiment of the present invention.
Figure 2H:
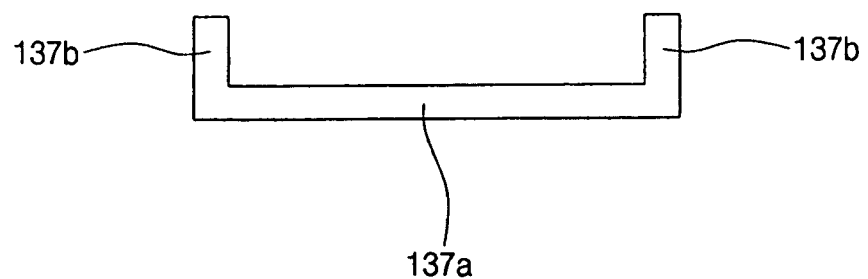
Figure 2I:
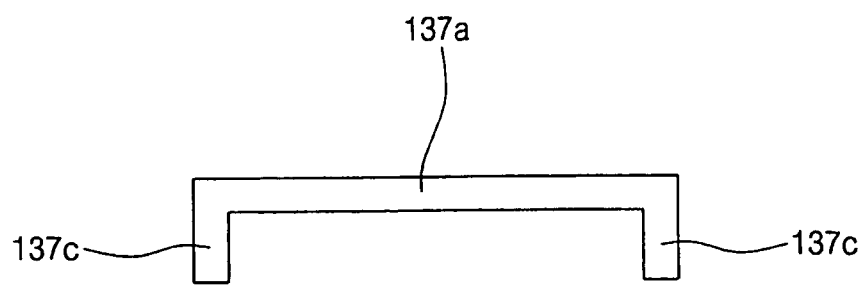

FIGS. 2G to 2J are plan views of the reinforcing plate according to this first example embodiment of the present invention. As illustrated in FIG. 2G, the reinforcing plate 137 may be formed of one plate 137a to be disposed only between the bare cell 110 and the protection circuit board 120. Further, the reinforcing plate 137 may be disposed between the bare cell 110 and the protection circuit board 120, and between a side surface of the bare cell 110 or the protection circuit board 120 and an inner surface of the main body 130. That is, as illustrated in FIGS. 2H and 2I, the reinforcing plate 137 may have extensions 137b and 137c at both edges of the plate 137a, the extensions extending toward the bare cell 110 or the protection circuit board 120.

Figure 2J:
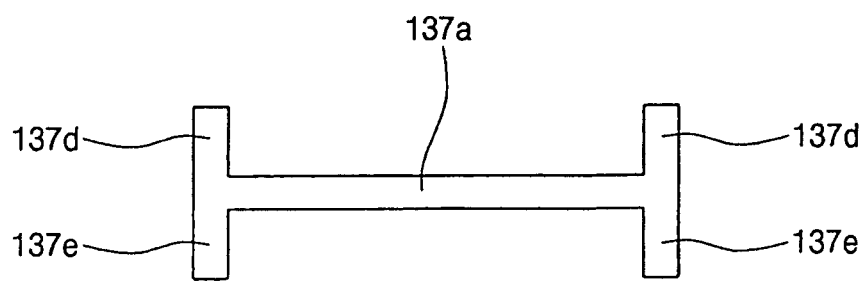

Furthermore, the reinforcing plate 137 may be provided between the bare cell 110 and the protection circuit board 120, and between the side surface of the bare cell 110 and the protection circuit board 120 and the inner surface of the main body 130. That is, as illustrated in FIG. 2J, the reinforcing plate 137 may have extensions 137d and 137e at both edges of the plate 137a, the extensions extending toward the bare cell 110 and the protection circuit board 120.

Figure 3A:
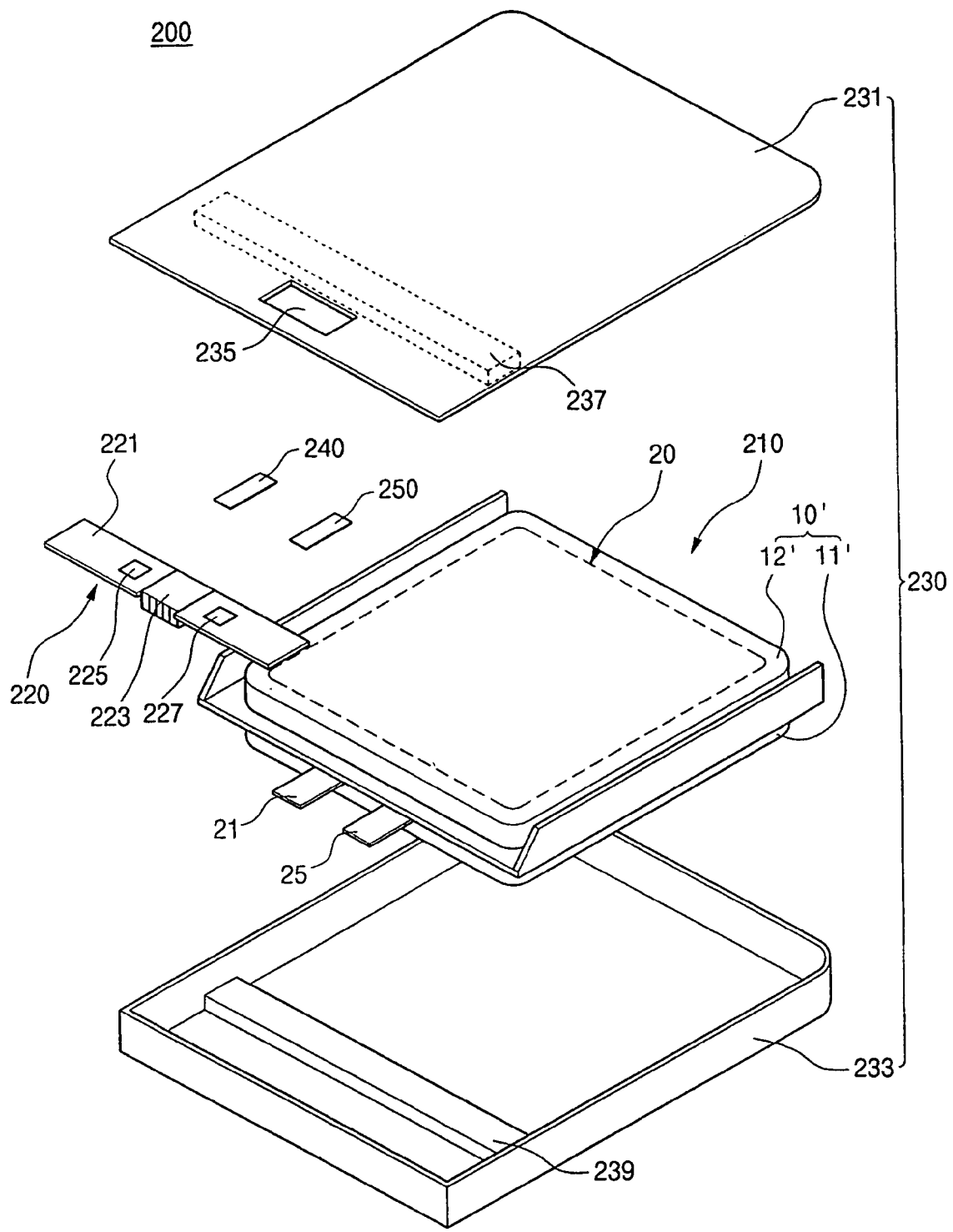
FIG. 3A is an exploded perspective view of the battery pack of FIG. 1 according to a second example embodiment of the present invention.

FIG. 3A is an exploded perspective view of the battery pack of FIG. 1 according to a second example embodiment of the present invention. Referring to FIG. 3A, the battery pack 200 includes a bare cell 210, a protection circuit board 220, and a main body 230 comprising first and second cases 231 and 233. The battery pack 200 may further include first and second lead plates 240 and 250 to electrically connect the bare cell 210 to the protection circuit board 220. Hereinafter, the first case 231 is referred to as an upper case, and the second case 233 is referred to as a lower case.

With respect to FIG. 3A, only the differences in the bare cell 210 from those illustrated in FIG. 2B will be described. Thus like numerals denote like elements described in FIG. 2B. The bare cell 210 includes an electrode assembly 20, and upper and lower casings 11' and 12' which accommodate the electrode assembly 20. While the bare cell 110 of FIG. 2B has a space for accommodating the electrode assembly 20 only in the lower casing 12, the bare cell 210 of FIG. 3A has spaces for accommodating the electrode assembly 20 in both the upper and lower casings 11' and 12'. The electrode assembly 20 and the upper and lower casings 11' and 12' of the bare cell 210, which are illustrated in FIG. 3A, will not be described any further here.

The bare cell 210 has positive and negative electrode tabs 21 and 25, which project from one side of a pouch type casing 10', that is, a front end portion of the bare cell 210. The protection circuit board 220, and the first and second lead plates 240 and 250 have the same configurations and functions as the structures with reference numbers 120, 140 and 150 in FIG. 2A. Thus, these structures in FIG. 3A will not be described any further. In similar fashion, the structures with reference numbers 221, 223, 225 and 227 of the protection circuit board 220 also have the same configurations and functions as the structures with reference numbers 121, 123, 125 and 127 of the protection circuit board 120 of FIG. 2A. Thus, these structures in FIG. 3A will not be described any further.

A main body 230 is provided outside the bare cell 210 and the protection circuit board 220 to protect the bare cell 210 and the protection circuit board 220 from external impact as well as to form an exterior shape. The main body 230 may comprise upper and lower cases 231 and 233 as in this second example embodiment.

Only differences of the upper and lower cases 231 and 233 from those illustrated in FIG. 2A will be briefly described. More details about these upper and lower cases 231 and 233 will be easily understood with reference to the descriptions of the upper and lower cases 131 and 133 of FIG. 2A. First and second reinforcing plates 237 and 239 are each formed on one side of the upper and lower cases 231 and 233, respectively, and referring to FIG. 3B, the first and second reinforcing plates 237 and 239 pass between the bare cell 210 and the protection circuit board 220. The first and second reinforcing plates 237 and 239 may be integrally formed with the upper and lower cases 231 and 233 during molding of the upper and lower cases 231 and 233.

Figure 3B:
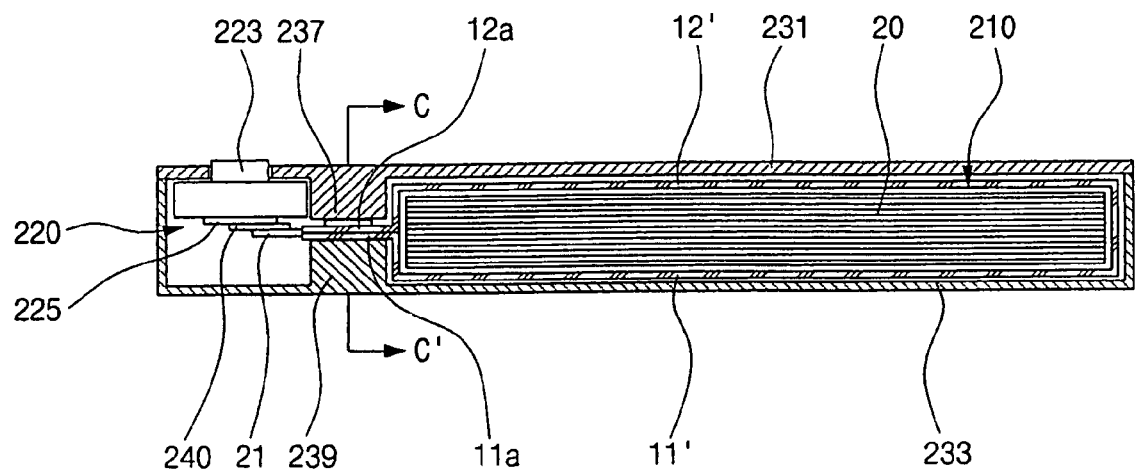
FIG. 3B is a cross-sectional view of the battery pack of FIG. 3A taken along line A-A' of FIG. 1.

FIG. 3B is a cross-sectional view of the battery pack 200 of FIG. 3A according to this second example embodiment of the present invention and taken along line A-A' of FIG. 1. In FIG. 3B, while the upper and lower casings 11' and 12' of the bare cell 210 are spaced apart form the upper and lower cases 231 and 233, the upper and lower casings 11' and 12' of the bare cell 210 may be in contact with inner surfaces of the upper and lower cases 231 and 233 to minimize the movement of the bare cell 210.

Referring to FIG. 3B, the lower end of the first reinforcing plate 237 formed in the upper case 231 may be formed in contact with the top surface of the front end portion of the bare cell 210 that is accommodated in the main body 230. Further, the upper end of the second reinforcing plate 239 formed in the lower case 233 may be formed in contact with the bottom surface of the front end portion of the bare cell 210 that is accommodated in the main body 230.

When the lower end of the first reinforcing plate 237 and the upper end of the second reinforcing plate 239 are in contact with the top and bottom surfaces of the front end portion of the bare cell 210, the first and second reinforcing plates 237 and 239 may press the top and bottom surfaces of the front end portion of the bare cell 210. However, since excess pressure on the top and bottom surfaces of the front end portion of the bare cell 210 may damage a pouch type casing 10', the applied pressure may be properly designed by those skilled in the art so as not to damage the pouch type casing 10'.

On the other hand, adhesion between the sealing parts 11a and 12a of the upper and lower casings 11' and 12' may be enhanced by the pressure applied to the front end portion of the bare cell 210 because of the lower end of the first reinforcing plate 237 and the upper end of the second reinforcing plate 239. Accordingly, easy opening of the sealing parts 11a and 12a of the upper and lower casings 11' and 12' due to external impact may be prevented, and thus, leakage of electrolyte can also be prevented.

Moreover, even if there is an external impact, the first and second reinforcing plates 237 and 239 serve as a support, which may prevent deformation of the upper and lower cases 231 and 233 as well as deformation of the bare cell 210 and the protection circuit board 220. Therefore, when the first and second reinforcing plates 237 and 239 are interposed between the bare cell 210 and the protection circuit board 220, the thicknesses of the first and second reinforcing plates 237 and 239 may be designed such that there is no space in the gap between the bare cell 210 and the protection circuit board 220 or the space in the gap between the bare cell 210 and the protection circuit board 220 is designed to be up to about 20 mm. The reasons for designing the thicknesses of the first and second reinforcing plates 237 and 239 in this way will be easily understood with reference to the descriptions of FIG. 2A, and thus will not be described any further.

Figure 3C:
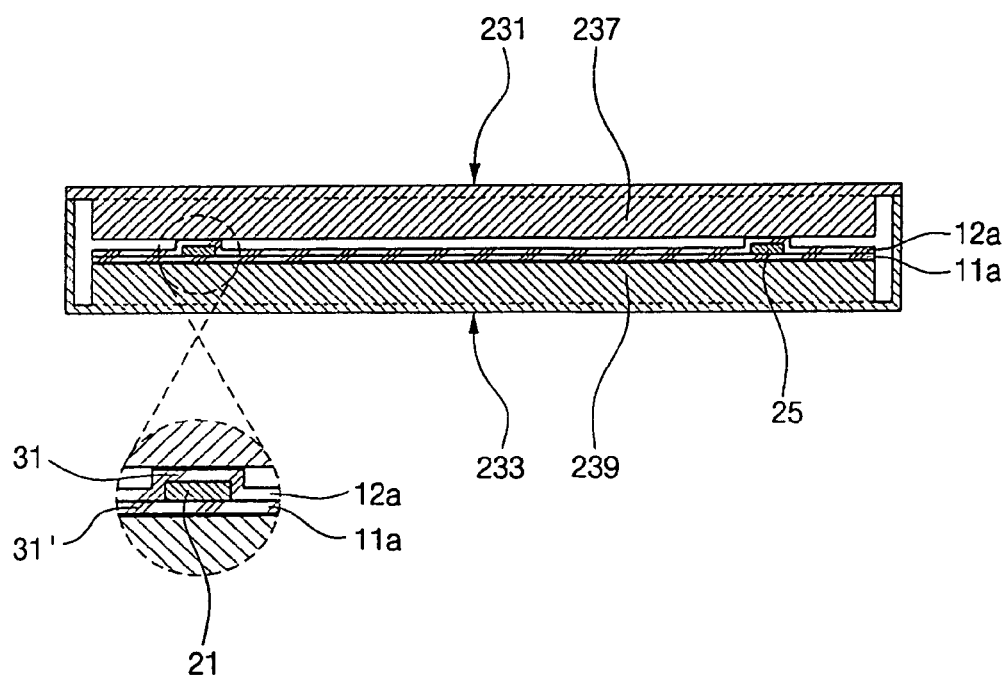
FIGS. 3C to 3E are cross-sectional views of the battery pack taken along line C-C' of FIG. 3B.
Figure 3D:
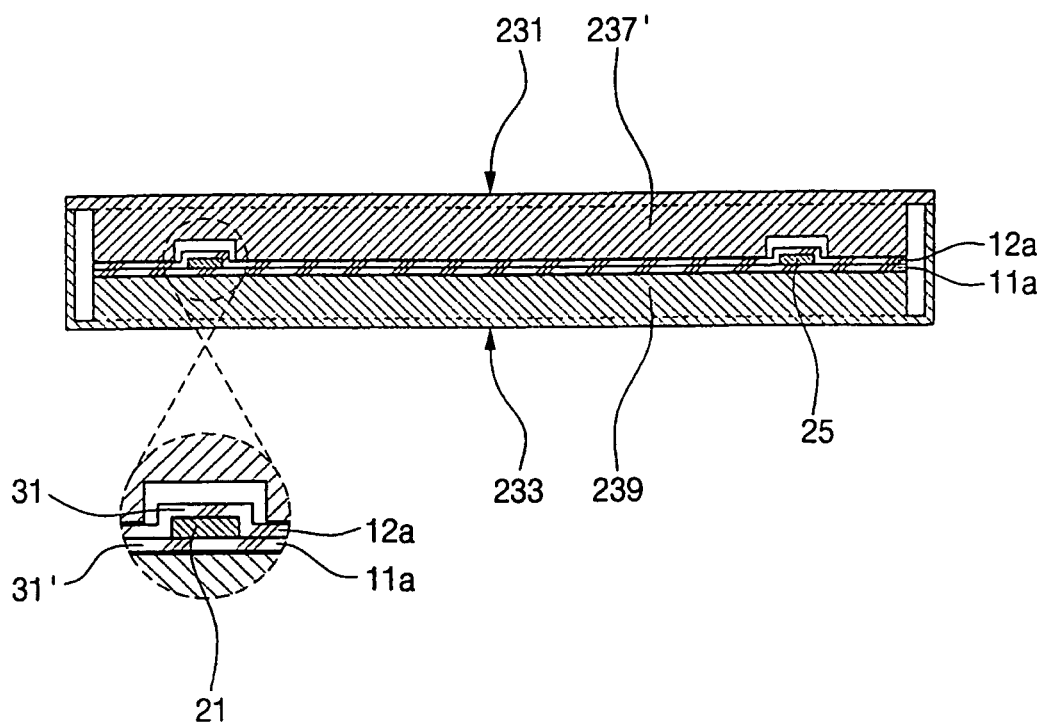
Figure 3E:
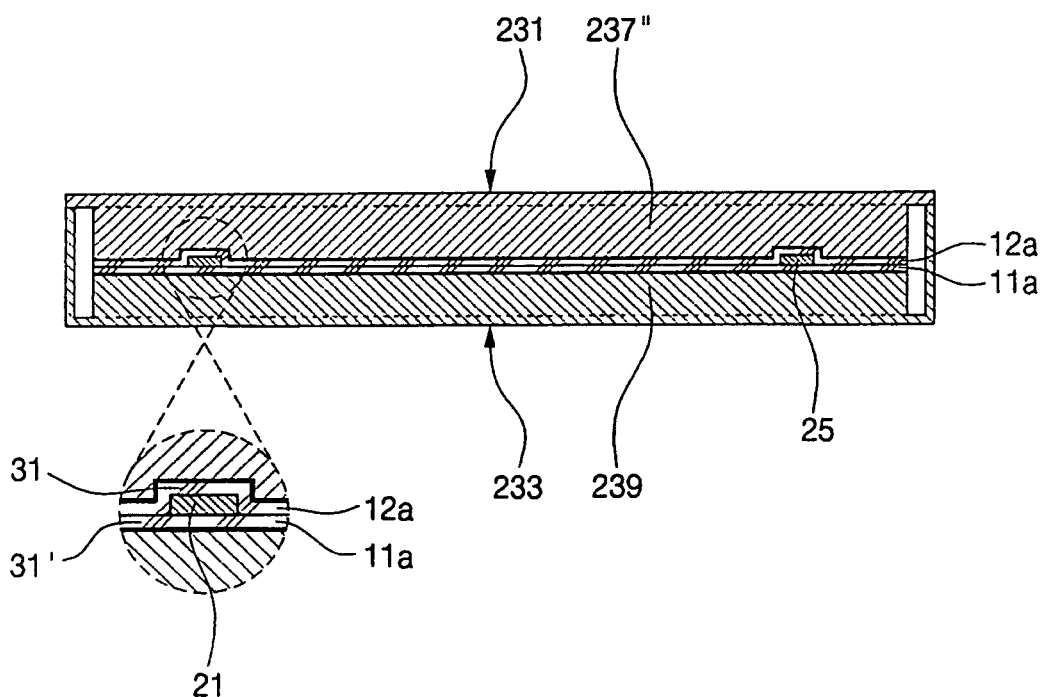

Referring to FIGS. 3C to 3E illustrating cross-sectional views of the battery pack 200 taken along line C-C' of FIG. 3B, as illustrated in FIG. 3C the lower end of the first reinforcing plate 237 may be formed in contact only with the top surface of a protrusion 31, which is formed on the front end portion of the bare cell 210 by the positive or negative electrode tabs 21 and. Alternatively, as illustrated in FIG. 3D, the lower end of the first reinforcing plate 237' may be in contact only with the top surface of the front end portion of the bare cell 210 with the exception of protrusions 31. Also, as illustrated in FIG. 3E, the lower end of the first reinforcing plate 237" may be in contact with the entire top surface of the front end portion of the bare cell 210 including protrusions 31. In all of the alternatives in FIGS. 3C-3E, the upper end of the second reinforcing plate 239 formed in the lower case 233 is in contact with the bottom surface 31' of the front end portion of the bare cell 210. Finally, with respect to this second example embodiment, the first and second reinforcing plates 237 and 239 may be formed in any one of the shapes illustrated in FIGS. 2G to 2J, which will not be described any further.

Figure 4A:
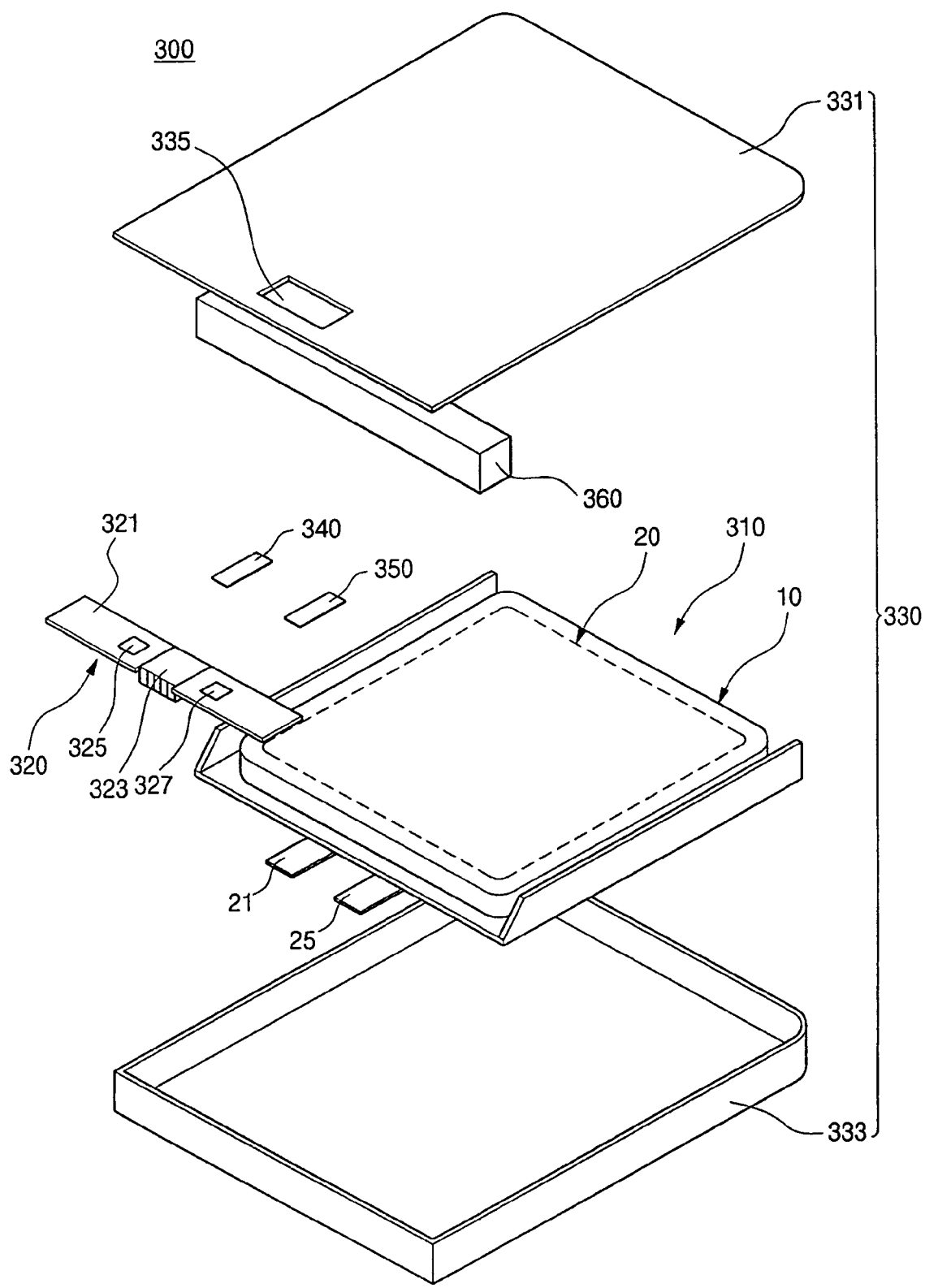
FIG. 4A is an exploded perspective view of the battery pack of FIG. 1 according to a third example embodiment of the present invention.

FIG. 4A is an exploded perspective view of the battery pack of FIG. 1 according to a third example embodiment of the present invention. Referring to FIG. 4A, the battery pack 300 includes a bare cell 310, a protection circuit board 320, and a main body 330 comprising first and second cases 331 and 333. The battery pack 300 may further include first and second lead plates 340 and 350 to electrically connect the bare cell 310 to the protection circuit board 320. Hereinafter, the first case 331 is referred to as an upper case, and the second case 333 is referred to as a lower case.

Since the bare cell 310 has the same configuration as that of FIG. 2B, it will not be described any further. Also, like reference numerals denote like elements described in FIG. 2B. The protection circuit board 320, and the first and second lead plates 340 and 350 have the same configurations and functions as the structures with reference numbers 120, 140 and 150 in FIG. 2A, and thus will not be described any further. Further, the structures with reference numbers 321, 323, 325 and 327 of the protection circuit board 320 have the same configurations and functions as the structures with reference numbers 121, 123, 125 and 127 of the protection circuit board 120 of FIG. 2A, and thus will not be described any further.

The battery pack 300 includes the main body 330 disposed outside the bare cell 310 and the protection circuit board 320 to protect the bare cell 310 and the protection circuit board 320 from external impact as well as to form an exterior shape. The main body 330 may comprise upper and lower cases 331 and 333 as in this third example embodiment.

Here, only the difference between the main body 330 from the main body 130 illustrated in FIG. 2A will be briefly described, and more details about this will be easily understood with reference to the descriptions of the main body 130 illustrated in FIG. 2A. In the main body 330 of this third example embodiment, a reinforcing plate is not formed in the upper case 331, which is a different structure from the main body 130 illustrated in FIG. 2A. Here, as illustrated in FIG. 4A, the battery pack 300 includes a reinforcing plate 360 interposed between the bare cell 310 and the protection circuit board 320.

Figure 4B:
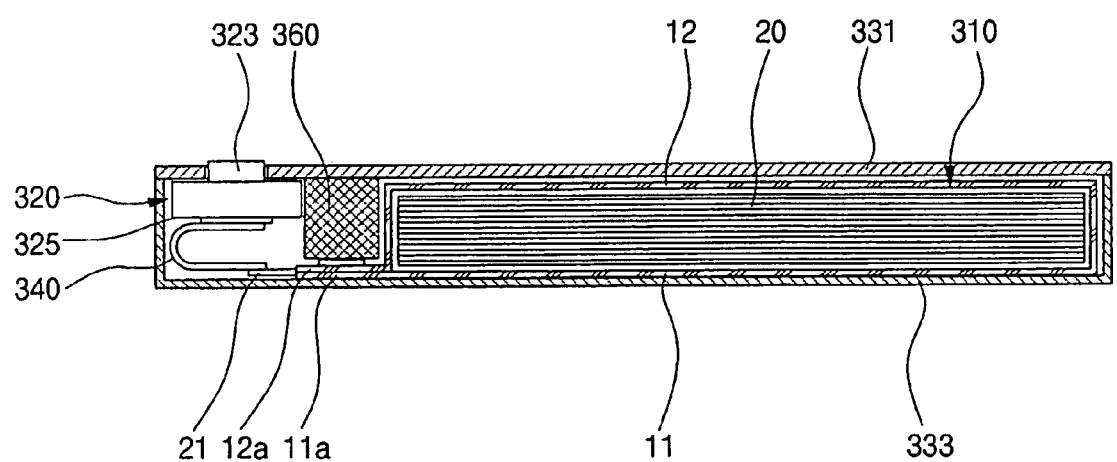
FIG. 4B is a cross-sectional view of the battery pack of FIG. 4A taken along line A-A' of FIG. 1.

FIG. 4B is a cross-sectional view of the battery pack 300 of FIG. 4A according to this third example embodiment of the present invention and taken along line A-A' FIG. 1. Referring to FIG. 4B, the reinforcing plate 360 is in contact with the top surface of the front end portion of the bare cell 310 that is accommodated in the main body 330. Further, the upper end of the reinforcing plate 360 is in contact with an inner surface of the upper case 331, and the reinforcing plate 360 is formed to pass between the bare cell 310 and the protection circuit board 320.

When the lower end of the reinforcing plate 360 is in contact with the top surface of the front end portion of the bare cell 310, the reinforcing plate 360 may be formed to press the top surface of the front end portion of the bare cell 310. The lower end of the reinforcing plate 360 may be formed in contact with a top surface of a protrusion 30, which is formed in the front end portion of the bare cell 310 by positive and negative electrode tabs 21 and 25, the top surface of the front end portion of the bare cell 310 except the protrusions 30, or the top surface of the front end portion of the bare cell 310 including the protrusions 30 as described with reference to FIGS. 2D to 2F. However, since excess pressure on the top surface of the front end portion of the bare cell 310 may damage the pouch type casing 10, the applied pressure may be properly designed by those skilled in the art so as not to damage to the pouch type casing 10.

On the other hand, adhesion between sealing parts 11a and 12a of the upper and lower casings 11 and 12 due to external impact may be enhanced by the pressure applied to the front end portion of the bare cell 310 because of the lower end of the reinforcing plate 360. Accordingly, easy opening of the sealing parts 11a and 12a of the upper and lower casings 11 and 12 it may be prevented due to the external impact, and thus, leakage of electrolyte can also be prevented.

When the reinforcing plate 360 is disposed between the bare cell 310 and the protection circuit board 320, the thickness of the reinforcing plate 360 may be designed such that there is no gap between the bare cell 310 and the protection circuit board 320 or the space in the gap between the bare cell 310 and the protection circuit board 320 is designed to be up to about 20 mm. The reasons for designing the thickness of the reinforcing plate 360 in this way will be easily understood with reference to the descriptions of FIG. 2A, and thus will not be described any further. Moreover, the reinforcing plate 360 may be formed in any one of the shapes illustrated in FIGS. 2G to 2J, and thus will not be described any further.

Figure 5A:
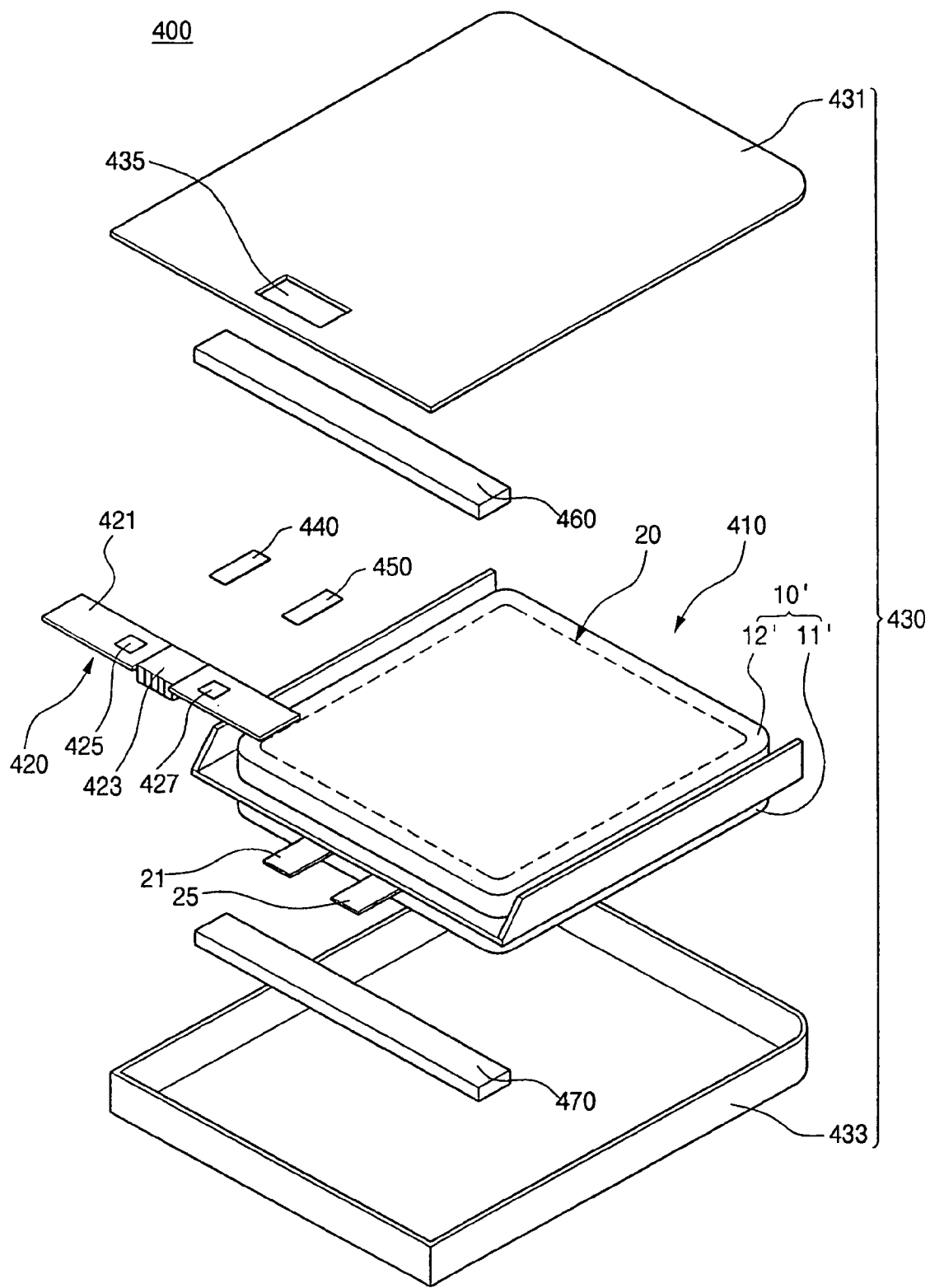
FIG. 5A is an exploded perspective view of the battery pack of FIG. 1 according to a fourth example embodiment of the present invention.

FIG. 5A is an exploded perspective view of the battery pack of FIG. 1 according to a fourth example embodiment of the present invention. Referring to FIG. 5A, the battery pack 400 includes a bare cell 410, a protection circuit board 420, and a main body 430 comprising first and second cases 431 and 433. The battery pack 400 may further include first and second lead plates 440 and 450 to electrically connect the bare cell 410 to the protection circuit board 420. Hereinafter, the first case 431 is referred to as an upper case, and the second case 433 is referred to as a lower case.

Since the bare cell 410 has the same configuration as the bare cell 210 of FIG. 3A, it will not be described any further. Also, like reference numerals denote like elements described in FIG. 3A. The protection circuit board 420, and the first and second lead plates 440 and 450 have the same configurations and functions as the structures with reference numbers 120, 140 and 150 in FIG. 2A, and thus will not be described any further. In similar fashion, the structures with reference numbers 421, 423, 425 and 427 of the protection circuit board 420 have the same configurations and functions as the structures with reference numbers 121, 123, 125 and 127 of the protection circuit board 120 of FIG. 2A. Thus, these structures in FIG. 5A will not be described any further.

The battery pack 400 may include a main body 430 disposed outside the bare cell 410 and the protection circuit board 420 to protect the bare cell 410 and the protection circuit board 420 from external impact as well as to form an exterior shape. The main body 430 may comprise upper and lower cases 431 and 433 as in this fourth example embodiment.

Only differences in the main body 430 from that illustrated in FIG. 2A will be briefly described, and more details about this will be easily understood with reference to the descriptions of the main body 130 of FIG. 2A. The main body 430 of this fourth example embodiment does not have a reinforcing plate in an upper case 431, unlike the main body 130 illustrated in FIG. 2A. As illustrated in FIG. 5A, the battery pack 400 has first and second reinforcing plates 460 and 470 interposed between the bare cell 410 and the protection circuit board 420.

Figure 5B:
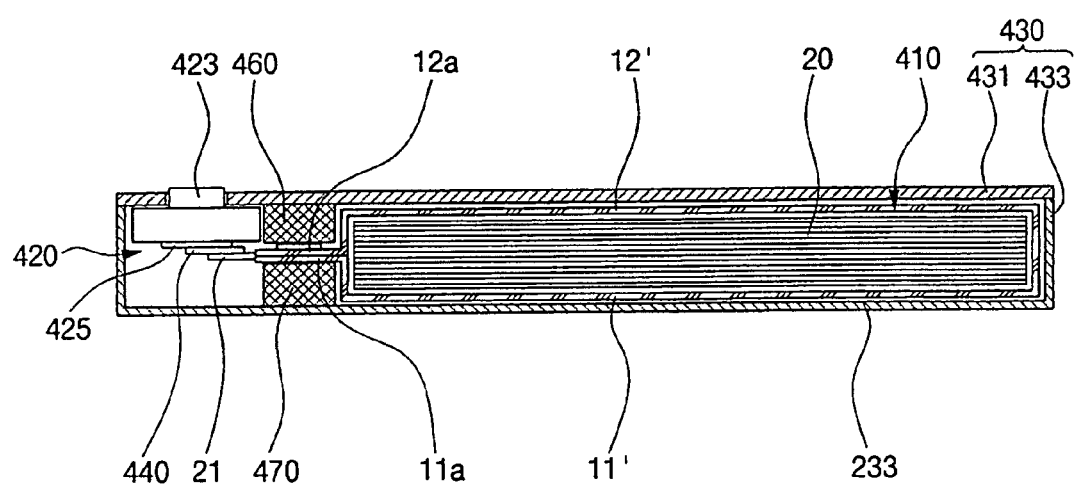
FIG. 5B is a cross-sectional view of the battery pack of FIG. 5A taken along line A-A' of FIG. 1.

FIG. 5B is a cross-sectional view of the battery pack 400 according to this fourth example embodiment and taken along line A-A' as in FIG. 1. Referring to FIG. 5B, the lower end of the first reinforcing plate 460 is in contact with the top surface of the front end portion of the bare cell 410 that is accommodated in the main body 430. Further, the upper end thereof is formed in contact with an inner surface of the upper case 431. The upper portion of the second reinforcing plate 470 is in contact with the bottom surface of the front end portion of the bare cell 410 that is accommodated in the main body 430, and the lower end of the second reinforcing plate 470 is in contact with the inner surface of the lower case 433.

The lower end of the first reinforcing plate 460 and the upper end of the second reinforcing plate 470 may be formed in contact with the top and bottom surfaces of the front end portion of the bare cell 410, thereby pressing the top and bottom surfaces of the front end portion of the bare cell 410. The lower end of the first reinforcing plate 460 may be formed in contact with the top surface of a protrusion 31 that is formed in the front end portion of the bare cell 410 by positive and negative electrode tabs 21 and 25, the top surface of the front end portion of the bare cell 410 with the exception of the protrusions 31, or the top surface of the front end portion of the bare cell including the protrusions 31 as described with reference to FIGS. 2D to 2F and 3C to 3E.

Here, the upper end of the second reinforcing plate 470 is in contact with the bottom surface 31' of the front end portion of the bare cell 410. However, excess pressure on the front end portion of the bare cell may damage the pouch type casing 10', and the applied pressure may be properly designed by those skilled in the art so as not to damage the pouch type casing 10'.

On the other hand, adhesion between sealing parts 11a and 12a of the upper and lower casings 11' and 12' may be enhanced by the pressure applied to the front end portion of the bare cell 410 because of the first and second reinforcing plates 460 and 470. Accordingly, easy opening of the sealing parts 11a and 12a of the upper and lower casings 11' and 12' may be prevented due to external impact, and thus, leakage of electrolyte can also be prevented.

When the first and second reinforcing plates 460 and 470 are disposed between the bare cell 410 and the protection circuit board 420, the thicknesses of the first and second reinforcing plates 460 and 470 are designed such that there is no gap between the bare cell 410 and the protection circuit board 420 or the space in the gap between the bare cell 410 and the protection circuit board 420 is designed to be up to about 20 mm. The reasons for designing the thicknesses of the first and second reinforcing plates 460 and 470 may be easily understood with reference to the descriptions of FIG. 2A, so they will not be described any further. The first and second reinforcing plates 460 and 470 may be formed in any one of the shapes illustrated in FIGS. 2G to 2J, and will not be described any further.

As described above, in the first and second example embodiments, battery packs 100 and 200 include reinforcing plates disposed in the main body, but in the third and fourth example embodiments, battery packs 300 and 400 include separate reinforcing plates, which are not formed in the main body. However, it can be clearly understood that, when there are two reinforcing plates as in the second and fourth example embodiments, the battery pack may include one formed in the main body, and the other separately formed from the main body.

According to aspects of the present invention, a battery pack is provided that can prevent deformation because of external impact and also prevent leakage of an electrolyte. Although a few embodiments of the present invention have been shown and described with reference to certain example embodiments thereof, it will be understood by those skilled in the art that changes may be made in these embodiments without departing from the principles and spirit of the invention, the scope of which is defined in the claims and their equivalents.

What is claimed is:

1. A battery pack comprising:
a bare cell having a positive electrode tab, a negative electrode tab, and a sealing part at least partially covering the positive and negative electrode tabs;
a protection circuit board electrically connected to the bare cell;
a main body comprising an upper case and a lower case, in combination accommodating the bare cell;
a reinforcing member protruding from the upper case toward the lower case, wherein the reinforcing member is disposed in a gap between the protection circuit board and the bare cell such that there is a first unfilled space between the reinforcing member and the protection circuit board and a second unfilled space between the reinforcing member and the bare cell, wherein the reinforcing member, the first unfilled space and the second unfilled space in combination entirely fill the gap; and
wherein the positive and negative electrode tabs extend between the reinforcing member and the lower case, wherein a portion of the sealing part is interposed between the reinforcing member and one of the positive and negative electrode tabs, wherein the reinforcing member contacts the portion of the sealing part without a gap between the reinforcing member and the portion of the sealing part.

2. A battery pack comprising:
a bare cell including a pouch type casing, an electrode assembly accommodated in the pouch type casing, a sealing part, and positive and negative electrode tabs extending out from one side of the pouch type casing, wherein the sealing part at least partially covers the positive and negative electrode tabs;
a protection circuit board electrically connected to the bare cell; and
a main body comprising an upper case and a lower case, in combination accommodating the bare cell and the protection circuit board; and
at least one reinforcing member, wherein the at least one reinforcing member protrudes from the upper case, wherein the reinforcing member is disposed in a gap between the protection circuit board and the bare cell such that there is a first unfilled space between the reinforcing member and the protection circuit board and a second unfilled space between the reinforcing member and the bare cell, wherein the reinforcing member, the first unfilled space and the second unfilled space in combination entirely fill the gap, and
wherein the positive and negative electrode tabs extend between the reinforcing member and the lower case, wherein a portion of the sealing part is interposed between the reinforcing member and one of the positive and negative electrode tabs, wherein the reinforcing member contacts the portion of the sealing part without a gap between the reinforcing member and the portion of the sealing part.

3. The battery pack according to claim 2, wherein the first and second unfilled spaces together span less than about 20 mm of the gap between the bare cell and the protection circuit board.

4. The battery pack according to claim 2, wherein the bare cell includes protrusions formed where the positive and negative electrode tabs extend.

5. The battery pack according to claim 4, wherein the at least one reinforcing member is in contact only with the protrusions of the bare cell, a region including a top surface of the bare cell with the exception of the protrusions, or a region including the protrusions and the top surface of the bare cell.

6. The battery pack according to claim 2, wherein each reinforcing member is formed of a flat plate.

7. The battery pack according to claim 6, the reinforcing member further comprising an extension extending toward the bare cell, an extension extending toward the protection circuit board, or extensions extending toward both the bare cell and the protection circuit board from both edges of the flat plate.

8. The battery pack according to claim 2, wherein the positive and negative electrode tabs are electrically connected to the protection circuit board by first and second lead plates.

9. A method of manufacture of a battery pack comprising an electrode assembly, positive and negative electrode tabs, an upper and lower casing, upper and lower cases, a protection circuit board and at least one reinforcing member, the method comprising:
    enclosing the electrode assembly in the upper and lower casing thus forming a bare cell;
    sealing the electrode in the upper and lower casings with a sealing part, wherein the sealing part at least partially covers that the electrode tabs;
    placing the bare cell in the upper case or the lower case;
    placing a protection circuit board in one of the upper and lower casings such that the electrode tabs are in electrical contact with the protection circuit board;
    forming at least one reinforcing member in a gap between the bare cell and the protection circuit board such that the positive and negative electrode tabs extend between the reinforcing member and the lower case, wherein the at least one reinforcing member contacts a portion of the sealing part interposed between the reinforcing member and the lower case without a gap between the portion of the sealing part and the reinforcing member, and wherein the reinforcing member is disposed in a gap between the protection circuit board and the bare cell such that there is a first unfilled space between the reinforcing member and the protection circuit board and a second unfilled space between the reinforcing member and the bare cell, wherein the reinforcing member, the first unfilled space and the second unfilled space in combination entirely fill the gap between the protection circuit board and the bare cell; and
    closing and sealing the upper and lower casings at a pressure such that the at least one reinforcing member fixes the bare cell and protection circuit board in place.

10. The method of claim 9, wherein the at least one reinforcing member is formed integrally with the upper case, the lower case or both the upper and lower cases.

11. The method of claim 9, wherein the at least one reinforcing member is a flat plate that is placed between the bare cell and the protection circuit board in the upper case, the lower case or both the upper and lower cases.

* * * * *